United States Patent
Tebeka et al.

(10) Patent No.: US 6,473,423 B1
(45) Date of Patent: Oct. 29, 2002

(54) METHOD AND SYSTEM FOR INTERACTIVE COMMUNICATION BETWEEN TWO TELEPHONE SETS VIA THE INTERNET

(75) Inventors: Henri Tebeka, Montmorency; Philippe Lumbroso; Eric Constantini, both of Paris, all of (FR)

(73) Assignee: Net2Phone, Inc., Newark, NJ (US)

( * ) Notice: Subject to any disclaimer, the term of this patent is extended or adjusted under 35 U.S.C. 154(b) by 0 days.

(21) Appl. No.: 09/142,706
(22) PCT Filed: Sep. 25, 1997
(86) PCT No.: PCT/FR97/01688
 § 371 (c)(1),
 (2), (4) Date: Sep. 14, 1998
(87) PCT Pub. No.: WO98/13986
 PCT Pub. Date: Apr. 2, 1998

(30) Foreign Application Priority Data

Sep. 26, 1996 (FR) .............................. 96 11761

(51) Int. Cl.$^7$ .............................................. H04L 29/06
(52) U.S. Cl. ....................................... 370/352; 370/354
(58) Field of Search ................................. 370/352–356

(56) References Cited

U.S. PATENT DOCUMENTS

| | | | | |
|---|---|---|---|---|
| 5,608,786 A | * | 3/1997 | Gordon | 370/352 |
| 5,610,910 A | | 3/1997 | Focsaneanu et al. | 370/351 |
| 5,838,665 A | * | 11/1998 | Kahn et al. | 370/352 |
| 5,995,606 A | * | 11/1999 | Civanlar et al. | 370/352 |
| 6,067,350 A | * | 5/2000 | Gordon | 370/352 |
| 6,078,579 A | * | 6/2000 | Weingarten | 370/352 |
| 6,011,794 A | | 9/2000 | Mordowitz et al. | 370/352 |
| 6,192,045 B1 | * | 2/2001 | Williams et al. | 370/352 |
| 6,243,373 B1 | * | 6/2001 | Turock | 370/352 |

FOREIGN PATENT DOCUMENTS

| | | |
|---|---|---|
| EP | 0 656 718 | 6/1995 |
| WO | 96/20553 | 7/1996 |
| WO | 96/24215 | 8/1996 |
| WO | 97/14238 | 4/1997 |
| WO | 97/23078 | 6/1997 |
| WO | 97/28628 | 8/1997 |

OTHER PUBLICATIONS

EPO, *International Search Report*, Jan. 2, 1998, International App. No. PCT/FR 97/01688, 3 pages.
Robin Gareiss, *Voice Over the Internet*, Sep. 1996, Data Communications vol. 5 No. 12, pp. 93,94,96,98,100 XP 000626552.
Denis Gracanin, *Implementation of the Voice Transfer Over TCP/IP*, 1993, Informacija Telekommunikacije Automati (ITA) vol. 12 No. 4, pp. 543–549 XP 000672244.
Nathan Muller, *Dial 1–800–Internet*, Feb. 1996, BYTE vol. 21 No. 2, pp. 83,84 86, 88 XP 000549779.
Gary Kim, *Talk is Cheap —Voice Over the Internet*, Jul. 15, 1996, America's Network vol. 100 No. 14, pp. 34–36, 38, 39, 60 XP 00067851.

* cited by examiner

*Primary Examiner*—Salvatore Cangialosi
(74) *Attorney, Agent, or Firm*—Oblon, Spivak, McClelland, Maier & Neustadt, P.C.

(57) ABSTRACT

The invention concerns a method and system for interactive communication between at least two users each provided with a telephone set of the switched telephone network, via the Internet. Each telephone set is directly locally connected to an associated interface device. The first user, who initiates the communication, dials on his set the telephone number of the second user indicating to his interface device that he wishes to communicate via the Internet. The interface device of the first user the connects with the interface device of the second user via the Internet, the two telephone sets being rung off. Once the connection has been established via the Internet, each interface device indicates to its associated telephone set, then each of the users picks up his set and communicates interactively with his correspondent via the Internet.

10 Claims, 4 Drawing Sheets

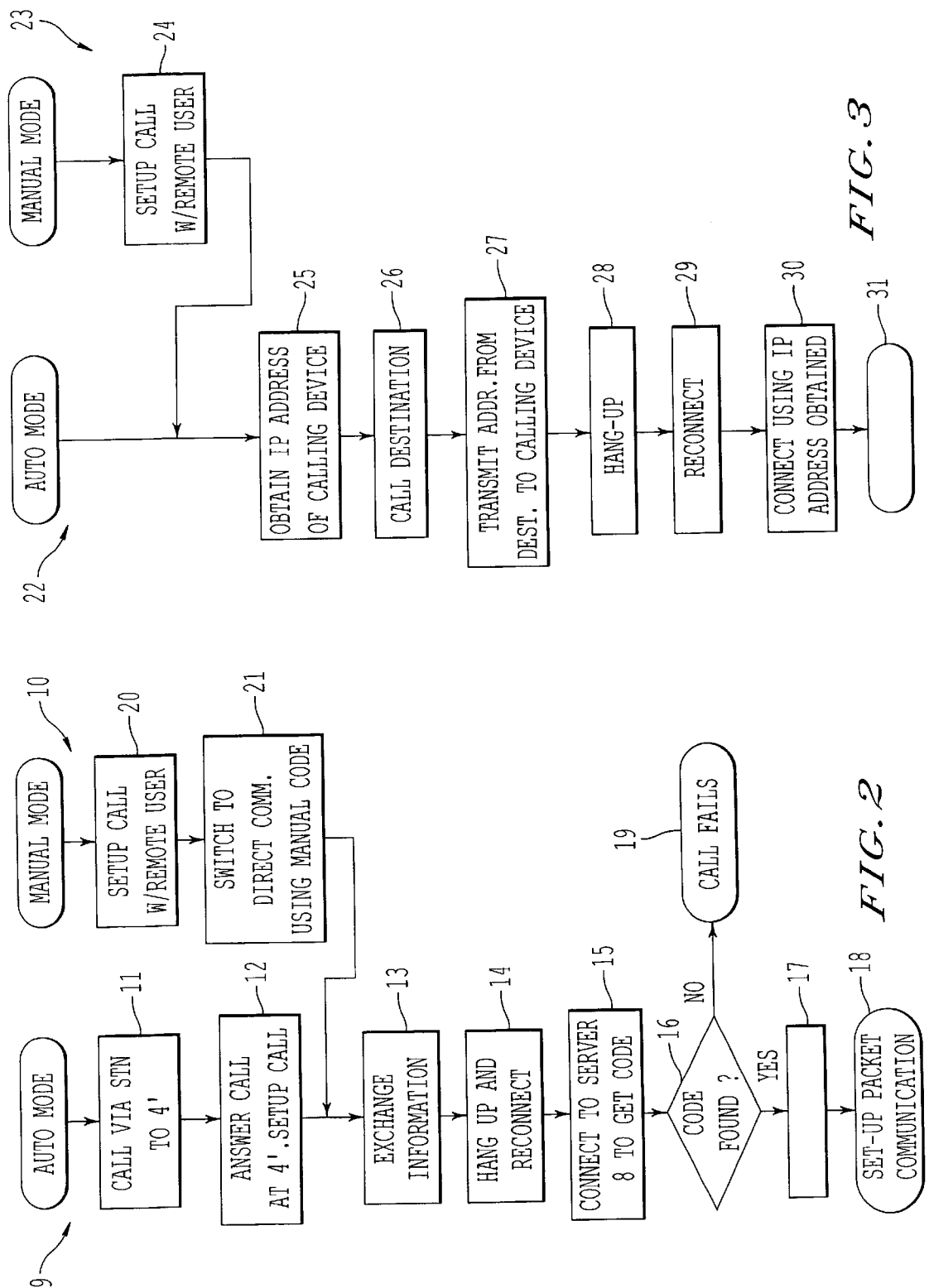

METHOD AND SYSTEM FOR INTERACTIVE COMMUNICATION BETWEEN TWO TELEPHONE SETS VIA THE INTERNET

FIELD OF THE INVENTION

The present invention relates to a process for interactive communication between two users each furnished with a telephone apparatus of the switched telephone network, via the Internet network.

It also relates to a system implementing such a process.

It finds a particularly important although non-exclusive application in the field of low-cost voice telephone communications.

BACKGROUND OF THE INVENTION

Systems are known which make it possible to use the Internet network to send and receive voice communications in real time with an opposite party connected to the Internet network, thus simulating the telephone.

The attractions of these systems resides in their low cost of use for the parties.

Access to the Internet network or to an equivalent network in fact generally costs the price of a local connection, in order to call the local access provider, and a moderate monthly subscription, i.e. less than 100 F. a month in France in 1996.

If the connection is to a distant party, this represents a considerable saving relative to the price of a normal connection at the long-distance or international tariff.

However, such systems have drawbacks.

They require in fact the presence of a powerful microcomputer for each party, a modem and a sound card, thus considerably limiting the number of potential users of the system.

Moreover they allow only persons having a permanent connection with the Internet network to be called directly.

In other cases, it is therefore necessary to go through the following procedure.

The users firstly agree on a date and time of appointment, as well as on the Internet server which will serve as meeting point. At the prescribed moment, the users must subsequently connect to the Internet network and then to the predefined server.

Finally, the opposite party must be searched for in the list of users of this server. If his name does not appear, it is necessary to wait, it being possible for the communication to be set up only after the presence of the opposite party has been detected.

This is a complex procedure.

It can be explained since the users which are not permanently connected to the Internet network have no fixed network address (IP address). It is therefore impossible to call them directly. The called user must therefore be warned, beforehand, and must himself log on.

An improvement to this system is currently envisaged by various operators.

The caller logs on to the Internet network, then to a special server geographically close to his destination party.

He then provides this server with the telephone number of his destination.

The server subsequently calls the destination and the communication can then be set up. In certain cases, the destination need not have any Internet equipment, the server taking charge of the interface with the conventional telephone.

However, this process also has drawbacks.

Indeed, it requires a server or local access provider capable of calling a user, this posing technical problems and connection billing problems.

This process also requires that the Internet address of the server or local access provider of the destination party be known, which necessitates that a complex routing system be set in place, or else a system limited to a small-size destination table, of which the telephone number and address of the provider will have been configured by the caller.

Finally, if the destination party changes access provider or simply his point of local access to the same provider, the configuration of this destination has to be updated for all potential callers.

SUMMARY OF THE INVENTION

The present invention aims to provide a communication process and system which are better than the prior known ones at meeting the demands of practice especially in that it dispenses with the requirement to use a microcomputer and its accessories, replacing them with a small standalone interface device which connects between an ordinary telephone set of the switched network and the analog or digital ordinary telephone line.

This device thus makes it possible to supplement any telephone set with the possibility of operating through the Internet network in an extremely simple and user-friendly manner.

The complexity of the call procedure is also eliminated by virtue in particular of a novel way of tackling the problem.

Thus, the traditional way of ironing out a problem posed by an Internet application, is to search for what will enable this problem to be solved actually within the Internet, its protocols and its services.

Thus, currently existing software has solved the call problem by using a conventional Internet service: IRC (Internet Relay Chat).

This service enables any two Internet users to be put in contact via a server (called an IRC server). This is the call process described earlier.

A gateway, for example, will also be used between the Internet provider or server and the destination party.

In the case of the present invention, a novel approach has been used, by putting calling and called interface devices into direct telephone contact for a few seconds, these exchanging the information required to meet up subsequently on the Internet network automatically or semi-automatically.

For this purpose the invention proposes in particular a process for interactive communication between at least two users each furnished with a telephone apparatus of the switched telephone network, via the Internet network, characterized in that, each telephone apparatus being directly connected locally to an associated interface device, a first user, the initiator of the communication, dials the telephone number of the second user on his telephone apparatus, for communication via the switched telephone network, while signalling to his associated interface device that he wishes a communication via the Internet network, the interface device of the first user sets up the communication with the interface device of the second user via the Internet network, the telephone apparatuses of the two users being on-hook, once the communication via the Internet network has been set up, each interface device signals this to its associated telephone apparatus, each of the users then takes his telephone apparatus off-hook and communicates interactively with his opposite party via the Internet network.

In advantageous embodiments, recourse is had to one or other of the following provisions:

the first user hangs up his telephone apparatus immediately after having signalled to the associated interface device that he wishes a communication via the Internet network, the said communication being subsequently set up automatically by the first interface device with the second interface device;

the first user obtains the telephone communication with the second user via the switched telephone network, signals to his opposite party via the said switched telephone network that he will continue the communication via the Internet network, and hands over to the interface device associated with his telephone apparatus which then sets up the communication with the other device associated with the telephone apparatus of the second user via the Internet network, while the said users respectively hang up their telephone apparatuses;

in order to communicate with one another the two interface devices exchange a respective appointment code relating to a predefined server via the switched telephone network, subsequently cut direct communication via the said switched telephone network, connect to their respective Internet access provider and then to the said predefined server and search for their appointment code, obtain their respective addresses (IP) on the Internet network, disconnect from the predefined server and then set up the telephone communication between the users via the said Internet network;

in order to set up the communication, the first interface device connects to the Internet network, obtains its address (IP) on the said network and, whilst remaining connected to the said network, sets up the communication with the second device via the switched telephone network and transmits its address (IP) thereto, and then the two interface devices disconnect from the switched telephone network, the second device connects to its Internet network access provider and then sets up the communication with the first device by virtue of the address (IP) obtained previously via the switched telephone network, in such a way as to allow communication between the devices via the Internet network;

the communication between the users is by voice;

the communication between the users is of the video type.

The invention also proposes a system for interactive communication implementing the process described above.

It also relates to a system for interactive communication between at least two users each using a telephone apparatus of the switched network, via the Internet network, characterized in that the system comprises at least two local interface devices, each connected on one side to the said telephone network and on the other side to a respective telephone apparatus, each device including:

means of storing and processing data transmitted by the telephone apparatuses, means of processing and sending signals devised so as to connect the said device to the Internet network and communicate with another device, means of receiving the signals, means of processing the signals received, and means of signalling the setting up of the said Internet connection to the associated apparatus.

Advantageously, the system includes means of means of [sic] voice compression/decompression.

Also the system advantageously comprises means of creating and identifying an appointment code in a predefined server.

Also advantageously the system includes means of connection and of disconnection of the switched telephone network and of the Internet network, in correlation the one with the other.

Advantageously the invention also proposes a process and a system of the type described above implementing an accelerated procedure for so-called "V23". fast connection, V23 being a standard of the International Telecommunications Union (ITU).

To do this, when connecting the first device to the switched network, a clocked frequency of 1300 Hz is transmitted which, if it is detected by the receiving device, triggers a carrier of lower frequency, for example 390 Hz.

The use of this carrier greatly speeds up the procedure.

There is also advantageously proposed a communication system, characterized in that it additionally includes fast means of connection which are able to transmit and detect the clocked 1300 Hz and means which are able to use a carrier wave of smaller frequency to speed up connection.

In another advantageous embodiment the process and the system are further improved by providing an original means of allocating IP addresses.

It is in fact difficult but necessary to ascertain the IP address allocated to an Internet user.

There are in this regard chiefly two ways of accessing the Internet: a permanent connection and a so-called "dial-up" episodic connection.

In the case of a permanent connection, each machine connected has a fixed and unique Internet address (IP address) within the entire world.

In the case of "dial-up" connections, the Internet access provider has a range of IP addresses which are reserved for him and which he allocates one by one to the users who connect up. Hence, one and the same user will therefore have a distinct IP address allocated to each of his connections.

The reason for this system is that the Internet addressing space is congested and it is not possible nowadays to allocate a fixed address to each user or item of equipment which can be connected.

In the telephony application it is necessary to ascertain the IP addresses. This is because a user who initiates a session must have software capable of contacting the other destination user, and therefore he needs his IP address.

The currently proposed solutions consist in publishing the address in a WEB page.

Software does in fact exist which makes it possible automatically to publish the IP address of a user who connects up in a personal WEB page for this user, which page can then be consulted by anybody on the Internet who needs this address.

Such a system has drawbacks. Publication on a WEB page is slow and greedy in terms of resources (data transferred and disk space on a server). Additionally, it is not easy to automate the fetching of this address for diverse applications.

Another method consists in using Internet electronic mail to exchange the variable IP addresses, using the fixed "e-mail" addresses of the users.

Here again there are drawbacks. The forwarding time of an e-mail is totally unforecastable and may be very long. The e-mail protocol is moreover complex to incorporate into an arbitrary application.

The basic principle of the communication process according to the advantageous embodiment of the invention described below is to allocate a fixed and unique serial number to any device which can be connected to the Internet and which desires to use the protocol, and which is stored in an apparatus referred to as an "IP Finder" apparatus which is connected to and can be interrogated via the Internet network.

As soon as a device is connected to the Internet, it despatches an information packet to this apparatus. This packet contains:

the IP address, the serial number of the device, a session number (automatically incremented by the device with each connection).

The term session should be understood to mean an attempted communication between two devices.

When another device needs the IP address of the first device, it despatches a packet to the IP Finder apparatus containing the serial number of the equipment whose IP address it seeks.

The IP Finder apparatus responds to it immediately with an information packet containing the sought-after IP address together with the number of the device.

The updating of the sessions of the devices is carried out during the initial telephone contact.

The device from which the need for connection arises in effect contacts, according to this embodiment of the invention, the destination device in a direct way and retrieves its current session number.

This exchange of sessions is carried out for example as follows:

direct telephone call and exchange of data between modems, or direct telephone call and exchange of data in voice frequencies, or call on a service of the radio-paging type.

In all cases, once initial contact has been set up, the destination device knows that it must connect to the Internet and despatch its packet to the IP Finder apparatus.

Advantageously, the process according to an embodiment of the invention therefore proposes to allocate a fixed and unique serial number to all the devices, which number is stored in at least one connected apparatus which can be interrogated by the devices so as to allow the calling device to retrieve the IP addresses of the called devices.

Also advantageously, as soon as a device is connected to the Internet, it despatches an information packet to the said apparatus, the said packet containing: the IP address, the serial number of the device and a session number, and when another device needs the IP address of the first device, it despatches a packet to the said apparatus, and the said apparatus responds by despatching an information packet containing the sought-after IP address as well as the number of the device.

Thus the invention proposes a system implementing one and/or the other of the above provisions, characterized in that a fixed and unique serial number having been allocated to each device, it furthermore includes at least one apparatus comprising means for storing the IP address of the devices which connect up to the Internet network, and their serial number, and means for searching for and transmitting a sought-after IP address and the serial number of a device corresponding to the request from another device.

The present invention also relates to interface devices such as described with reference to the text and to the figures.

The present invention will be better understood on reading the description of the embodiments given below without any limitation being implied.

BRIEF DESCRIPTION OF THE DRAWINGS

It refers to the drawings which accompany it in which:

FIG. 2 is an operational flowchart of an embodiment of the main step of the process according to the invention on an analog line.

FIG. 3 is an operational flowchart of an embodiment of the main step of the process according to the invention on a digital line.

DETAILED DESCRIPTION OF THE INVENTION

Figure 1:
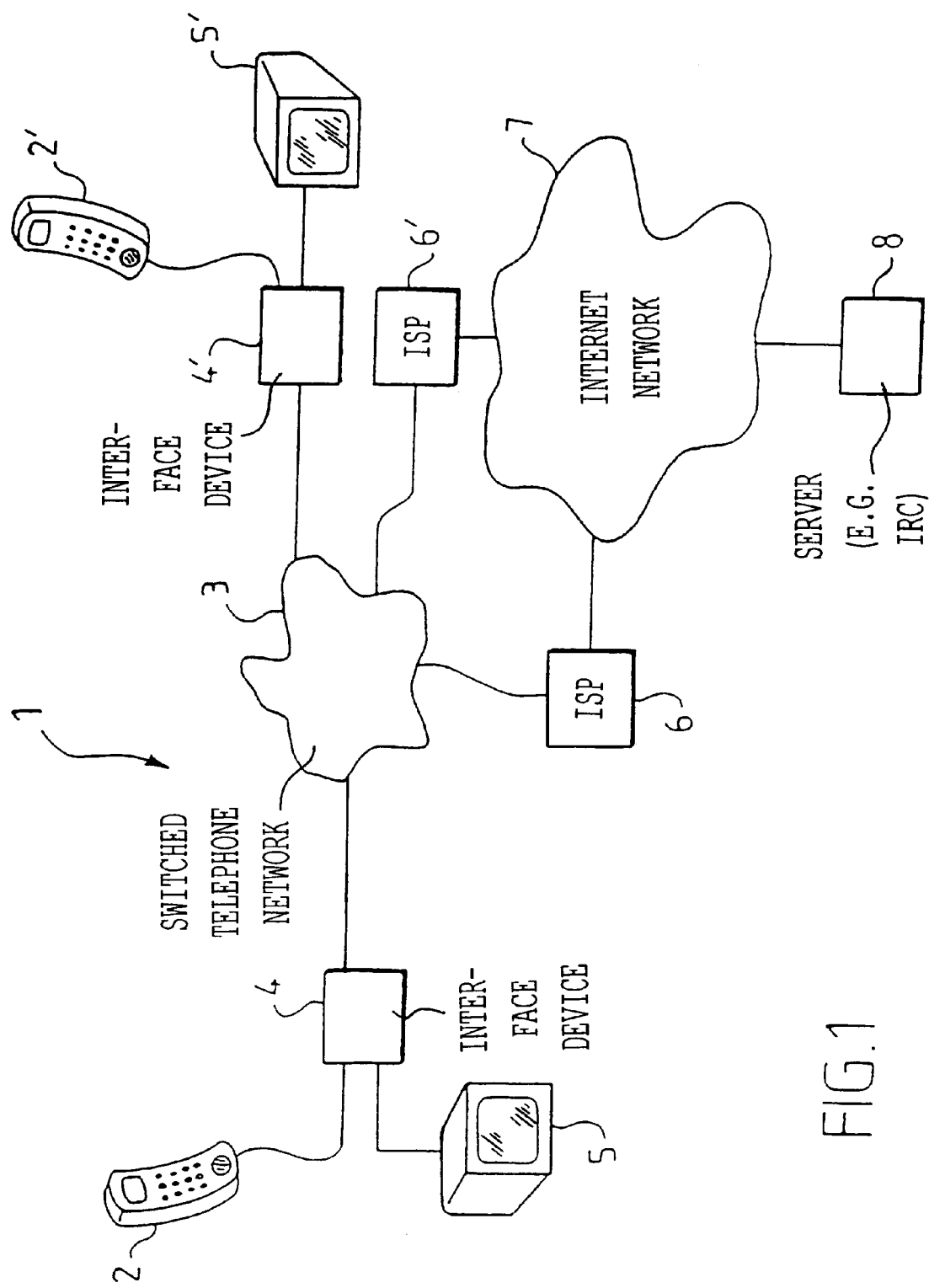
FIG. 1 is a diagrammatic view of an embodiment of the system according to the invention.

FIG. 1 shows a system for interactive communication between two users each using a telephone apparatus 2, 2' of the switched network 3.

The system comprises at least two local interface devices 4, 4' each connected on one side to the said switched telephone network 3 and on the other side to the corresponding telephone apparatus 2, 2'.

Each device 4 includes means of storing and processing the data transmitted by the telephone apparatuses, which may also and for example be video apparatuses 5.

The device 4 also comprises means of processing and sending signals devised so as to connect the device 4 to the Internet network, via a provider of access 6 to the said Internet network 7.

Also provided is a predefined server 8 connected to the network, which will serve as meeting point as will be described further on with reference to FIGS. 2 and 3.

FIG. 2 is an operational flowchart of the main step of connection implemented by the process according to the invention on an analog line.

Two modes of operation are provided, namely the automatic mode 9 or the manual mode 10.

In automatic mode the so-named "Free Talk" box or device calls the destination "Free Talk" box or device 4' via the switched telephone network 3 (step 11).

The called device 4' then sets up direct communication via the switched network 3 with the calling device 4, for example by taking up the call if the destination user had taken his telephone set off-hook (step 12).

The two devices 4 and 4' then exchange over the switched telephone network 3 a respective appointment code relating to a predefined server 8 for example of the IRC type (step 13).

The two devices 4 and 4' then cut off direct communication via the switched network and connect to their respective Internet access providers 6 and 6' (step 14).

The two devices subsequently connect to the predefined server 8 and search for the agreed appointment code (step 15).

If the code is found within a predefined period (step 16), the devices 4 and 4' obtain their respective network addresses (IP) and disconnect from the predefined server 8.

The devices then set up communication between one another for the telephony function according to the invention (step 18).

In the case in which the code is not found within a predefined period (step 16), a prompt indicating that the call has failed (step 19) is given, the user being for example forewarned by a sound signal.

The process just described with reference to FIG. 2 can also operate in manual mode.

In this case instead of the two initial steps 11 and 12, two initial steps 20 and 21 are provided.

During step 20, the calling user sets up an ordinary voice communication with the destination user via the switched telephone network 3, then requests mode transfer according to the invention for example by effecting the code "###".

The two devices then recover the voice communication in progress and enter into direct communication (step 21).

Steps 13 to 18 just described are then implemented.

FIG. 3 shows an embodiment of the process according to the invention on a digital line in automatic mode (22) or in manual mode (23), the latter mode differing from the automatic mode in that it includes a further initial step 24.

In this step the calling user sets up an ordinary voice communication with the destination user and then requests mode transfer according to the invention and hangs up.

The process next comprises a step 25 in which the calling device connects to the Internet network and obtains its address IP. It subsequently remains connected to Internet.

In the next step 26 the calling device calls the destination called box or device directly via the switched telephone network either by using the second channel B or by using the mini message service.

The calling device (step 27) then transmits its address IP to the destination device.

Thereafter (step 28) the two boxes cut off the direct communication via the switched telephone network with one another (in the case of channel B).

The next step 29 sees the destination device connect to its customary Internet access provider.

The destination device (step 30) then connects to the calling device or box by virtue of the address IP obtained above.

Finally, the interface devices set up between one another the communication between one another for the voice telephony function (step 31).

Figure 4:
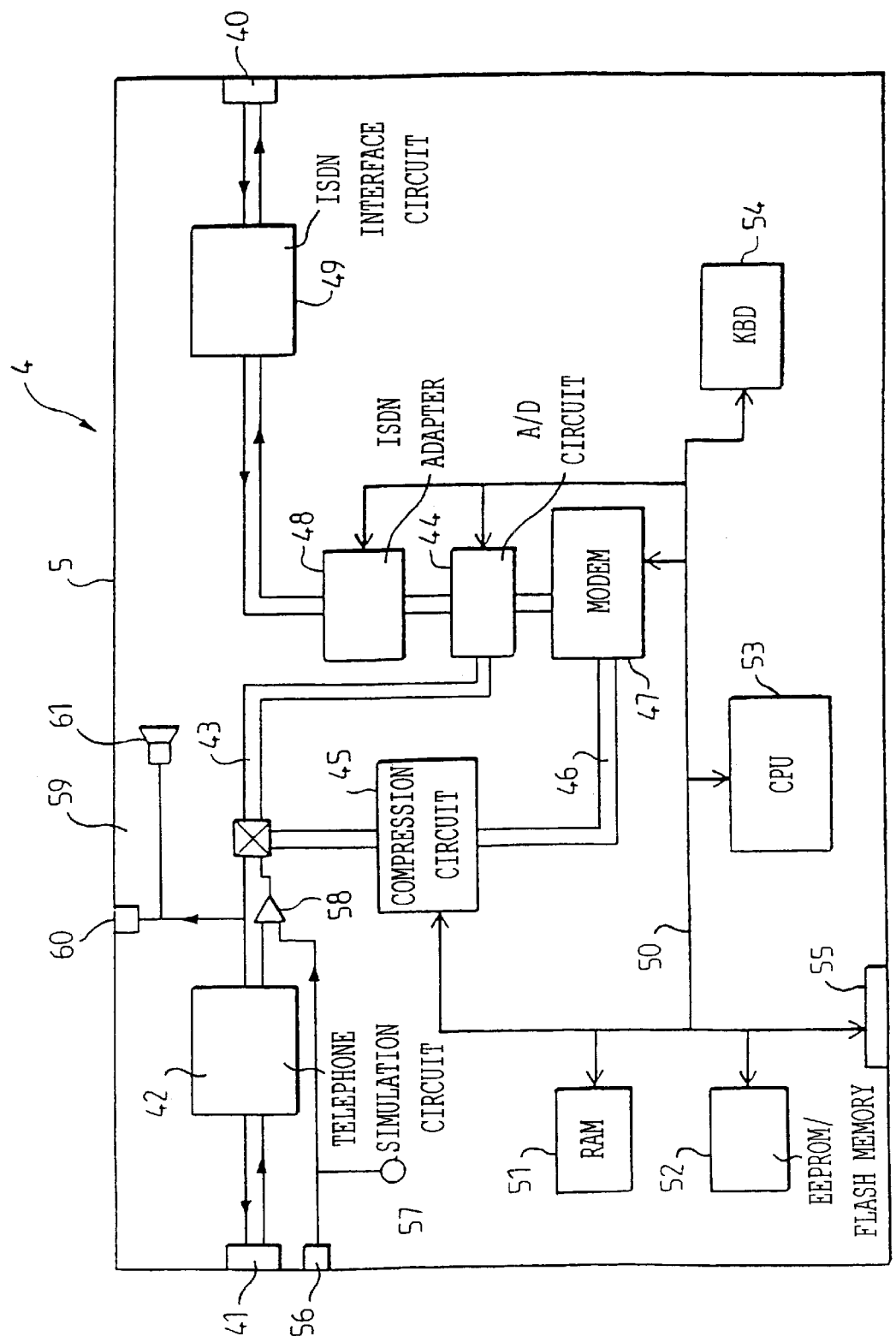
FIGS. 4 and 5 are block diagrams of interface devices of the invention which are more particularly described here.

FIG. 4 shows a block diagram of an interface device 4 which can be used for receiving or sending with digital telephone lines 40.

The device 4 includes a box 5 incorporating semiconductor means of the type known per se, devised so as to carry out the specified functions.

The device includes a link 41 to the receiver or telephone set connected to a telephone simulation circuit 42 known per se and connected via a link 43 to an analog digital converter system 44.

The output of the circuit 42 is moreover also connected (shunting) to a voice compression circuit 45 of known type, itself connected, via a link 46, to a modem 47 known per se.

The analog digital conversion circuit 44 also connected to the modem 47 is linked to an ISDN adaptation circuit or system 48 known per se, the output of which is connected via an interface circuit 49 with an ISDN line, to the telephone line 40.

The circuits 44, 45, 47 and 48 are connected, via a data bus 50, to a random access memory 51, a memory of EEPROM type, or Flash EPROM 52, to a computational microprocessor 53 and for example to a display circuit and/or to a keyboard 54.

The bus is itself connected at output to a parallel or serial extension connector 55.

The interface device 4 furthermore includes a microphone socket 56, a microphone 57, and a device 58 for amplifying connection to the circuit made up of the various electronic circuits 44, 45.

A system 59 consisting of a loudspeaker socket 60 and a loudspeaker 61 is also provided and connected to the output of the telephone simulation circuit 42.

Figure 5:
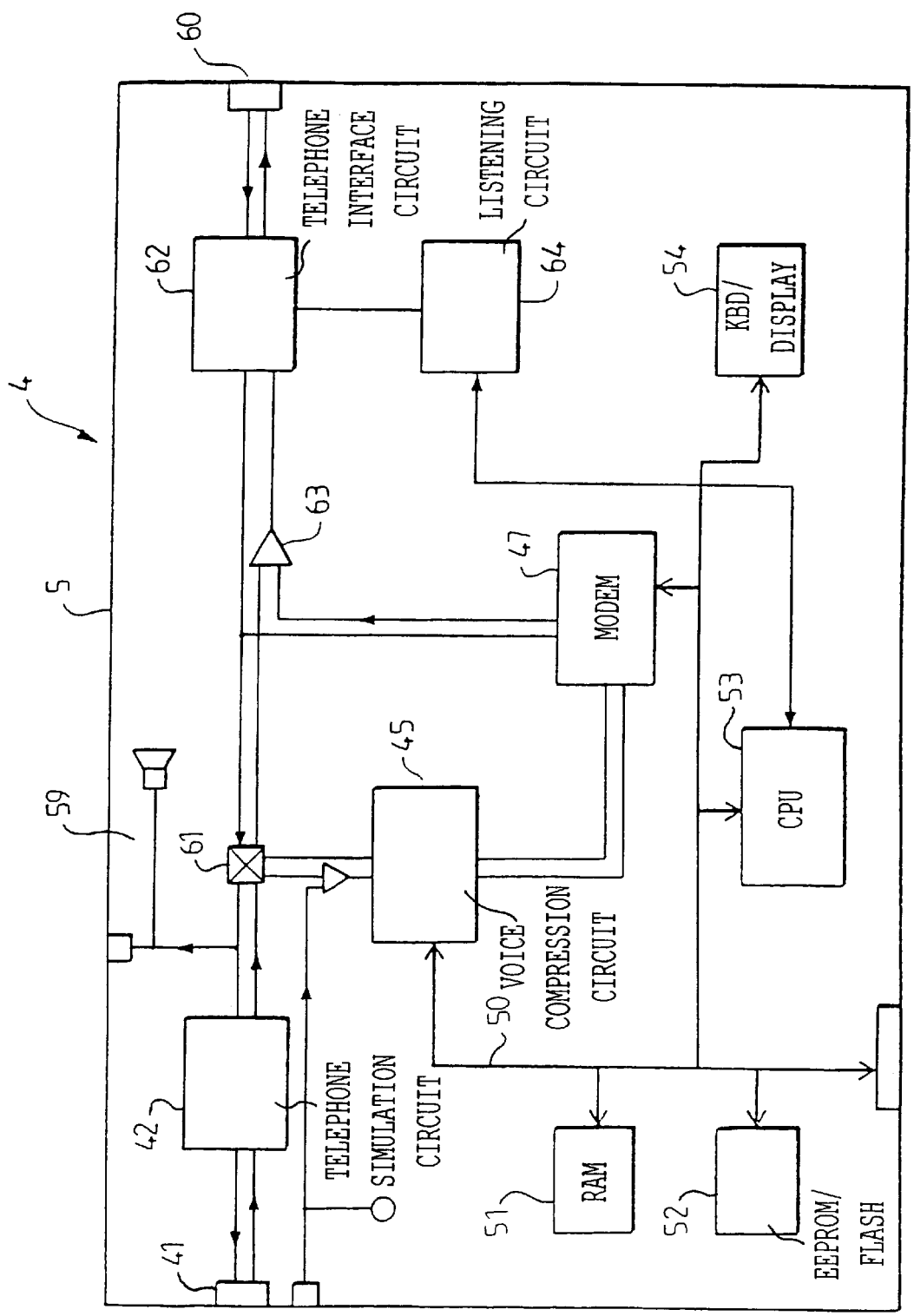

FIG. 5 shows a block diagram of an interface device 4 for connection with an analog telephone line 60.

The device 4 includes a box 5 which will act similarly to the circuit described with reference to FIG. 4, a socket 41 and circuits 42, 55 and 59.

A shunting device 61 makes it possible to connect the telephone set management circuit 42 either to a circuit 62 for interfacing with the telephone line, or with the voice compression device 45.

This device is connected at output to the modem 47 connectable via an amplification circuit 63 to the telephone line interface circuit.

The device 4 moreover includes as described earlier, a RAM memory 51 connected via a data bus 50 to the voice compression circuit, an EPROM memory 52, a microprocessor 53 which can drive a high-impedance listening circuit 64 linked to the telephone line interface circuit 62.

A display/keyboard circuit 54 is also provided connected to the data bus 50.

The operation of a system according to the invention in automatic mode will now be described.

The caller dials the telephone number of the destination while signalling to the associated device that he wishes a call via Internet, for example with the aid of a special prefix such as "###".

He hangs up his telephone set and waits.

The device then sets up communication with the called device fully automatically, via the process described in detail above.

Once communication between the two devices has been set up, the respective interface devices cause their associated telephone set to ring.

The users then take their telephone sets off-hook and speak.

When they have finished they hang up.

A method in so-named normal mode is also advantageously provided.

It makes it possible to be assured beforehand of the possibility of call and/or of the presence of the call destination party.

Here, the caller calls the destination in the normal way.

He is therefore assured of the presence and of the availability of the destination party, and signals mode transfer according to the invention thereto.

The caller then requests his device to transfer to Internet for example by keying a sequence of special buttons such as "###" on his telephone set.

The calling and called devices then seize control of the telephone line and set up communication via Internet. Meanwhile the users hang up their set.

Once communication between the two devices has been set up, the devices cause their associated telephone sets to ring.

The users then take their telephone sets off-hook and speak.

When they have finished they hang up.

The method thus completely avoids the need to define an appointment time and server, so as to meet up on the Internet.

In what follows and for convenience the elements of the sending device are referenced with numerals without any "'" (4,5, . . . ) and those of the receiving device with a "'" (4',5', . . . ).

In a particular embodiment, the first user employs an accelerated procedure termed "V23" fast connection so as to connect up with the second user while dispensing with part of the sequence for establishing contact (sending detection of 2100 Hz).

A V23 connection thus lasts around 6 seconds reckoned from the moment at which the second device picked up the line, terminating for example with a message of the type "CONNECT <LINE SPEED>".

In the mode described here, the modem of the first device is, initially, by default, in a different mode from the "V23 fast connection" mode. To make it enter this mode, the user executes a so-called "ATR" command, the modem additionally exiting this mode when the user hangs up the telephone, or if the user transmits another command thereto.

More precisely, the specific procedure for programming the microprocessor of the device is for example:

- initialization of the procedure by setting the modem 47 of the sending device 4 to V23 mode with a command of the type "AT+MS-3.0.1200.120032" in the so-called "AT" command language (standard command for Modem) by the user pressing a key;
- command proper of the microprocessor 53 (here termed "ATR") making it possible to dispense with standby and with the detection of the 2100 Hz;
- dialing by the modem of the device or seizing of the line with a command of the type "ATD<(.)TELEPHONE NUMBER" or "ATD" in the AT language;
- sending of the clocked 1300 Hz;
- then detection, between two sendings of the clocked 1300 Hz, of the V23 carrier sent in response by the modem 47' of the second device 4';
- if the sending device 4 detects nothing, a hang-up occurs after a predetermined time, denoted S7 (for example 130 seconds by default).
- If there is detection, the device 4 sends a carrier at for example 390 Hz, and transmits a connection message to the terminal ("CONNECT 75/1200 in the example).

Additionally the user can at any moment interrupt fast connection for example by despatching a character thereto.

In the embodiment described here, and for the fast connection system to operate, it is also necessary that the second user has previously to order at his end the modem 47' of his device 4' regarding 1300 Hz high-impedance detection, this being the rate issuing from the modem of the first device 4, the one calling.

An immediate acknowledgement subsequent to this command is performed by the device 4', whose modem 47' eavesdrops on the high-impedance line and operates for example as follows:

If there is detection of the clocked 1300 Hz sent by the modem 47 of the first device 4, the modem 47' of the second device 4' despatches a "DATA" message to the microprocessor 53' and exits the eavesdropping mode.

The microprocessor then automatically commands the modem 54' of the second device automatically (ATR and ATA commands or on a single ATRA line—in the AT language) to commence the fast connection sequence in response mode.

The modem 54' is then placed on standby for detection of the 390 Hz of the carrier in V23 call.

If the modem detects the carrier, it returns the message "CONNECT 1200/75" making it possible to initiate the connection via the Internet.

If on the other hand after S7 seconds the modem 47' has still not detected any carrier, it returns the message "NO CARRIER".

In the case in which the second device 4' and its modem are in the high-impedance clocked 1300 Hz detection mode (eavesdropping mode) and the second user wishes to interrupt it, it merely needs to send for example the command "ATR2" to the modem which acknowledges and exits the eavesdropping mode.

With a fast connection protocol as described above the effectiveness of the system is further improved, the lag in passing to the telephone communication mode via the Internet being significantly reduced (of the order of 25%).

The IP Finder apparatus will now be more particularly described.

It consists of a combination of a microprocessor, a large-capacity random access memory and a network interface and a mode memory or hard disk for the software.

IP Finder is connected to the Internet via its network socket (generally an Internet socket).

Once connected to the Internet network, IP Finder carries out the IP address search function described in the IP Finder process and does so for a predefined range of serial numbers.

To do this it uses for example the following method.

A random access memory block is allocated to each serial number in a fixed manner so as to contain the IP address and the session number. The size of this block is for example in the case of a session number on one byte and of an IP address on 4 bytes a total of 5 bytes.

The total capacity of the random access memory therefore determines the breadth of the range of serial numbers which a single IP Finder apparatus will be capable of managing.

For example in the case of a memory with 128 megabytes the apparatus will be able to manage a range of 24 bits of serial numbers, i.e. around 16 million devices, without any problem.

The apparatus will merely have to multiply the serial number received by 5 to obtain the address of the memory block assigned to this number. Thus, the processing of enquiries is extremely simple and fast and a straightforward standard microcomputer processor can largely respond to the simultaneous requests from even a large number of items of equipment.

The method for determining the device to be contacted depending on the complete serial number is for example as follows:

The high-order bytes of the serial number (beyond the range managed directly by a single device) are converted into hexadecimal and incorporated into a domain name which will be that of the device managing this range.

For example, if the serial number (in hexadecimal) is 00.03.C2 12.23.55 the domain name associated with the device will for example be "ip_finder_0003com". This domain name will provide access to the IP Finder apparatus responsible for the serial number range beginning with 0003.

In this way it is sufficient to add an IP Finder apparatus for each new range as and when serial numbers are allocated.

The advantages of the communication process and of the system when they are supplemented with the IP Finder apparatus are as follows:

The system and the process of the invention become extremely fast. Normally only 4 packets are exchanged in all for a session.

They require little passband, need no resource from the existing servers (WEB e-mail etc.), and are moreover fully automatic and easy to incorporate into any application on account of their great simplicity.

With the embodiment of the invention described more particularly, the destination party therefore has nothing particular to do other than to answer the telephone normally.

Likewise no particular logistic support, of the hardware type, no specific billing of calls on the part of Internet access providers are necessary, this being unlike the method which consists in having the destination party called via his local access provider or a server.

Neither does the method according to the invention require any routing system or destination table, the straightforward telephone number of the destination party being sufficient.

Moreover the process according to the invention is independent of the Internet access provider of the destination party, who can therefore change it as he pleases without hampering operation.

Thus, the method of the invention is immediately applicable throughout the entire world without requiring any change of configuration or logistics of the access providers, and all the possessors of a device according to the invention can immediately be called by all the others without any need for configuration or for updating of tables.

The user can use the system in almost as straightforward a way as the ordinary telephone. Of course the invention is usable with telephone apparatuses other than handsets, such as fax machines for example, is not limited to telephone communication between two parties, but can cope with several parties communicating simultaneously and, more generally, is not limited to the embodiments more particularly described here but on the contrary embraces all variants thereof which come within the framework of equivalences.

What is claimed is:

1. A method for communicating between at least two users each furnished with a telephone apparatus of a switched telephone network, via the Internet network, each telephone apparatus being directly connected locally to an associated interface device, the method comprising:
   dialing, by a first user using the switched telephone network, a telephone number of a second user using a first telephone apparatus,
   signalling to a first interface device to perform a hang-up and reconnection operation via the Internet network with the second interface device,
   performing, under control of the first interface device the hang-up and reconnection operation to establish communication with the second interface device via the Internet network,
   signalling, via each interface device that the hang-up and reconnection operation has completed, and
   communicating between the first and second users via the Internet network,
   wherein the step of signaling the first interface device comprises exchanging a respective appointment code relating to a predefined server via the switched telephone network, and
   wherein the step of performing the hang-up and reconnection operation comprises
      cutting direct communication via the switched telephone network,
      connecting the first and second interface devices via the Internet network
   to the predefined server,
      searching for the appointment code; and
      establishing communication between the users via the said Internet network using a result of the search.

2. The method according to claim 1, further comprising hanging up a corresponding telephone apparatus immediately after having signalled to the associated interface device to perform the hang-up and reconnection operation.

3. The method according to claim 1, wherein the step of signaling the first interface device comprises signaling the first and second interface devices to exchange hang-up and reconnection information over the switched telephone network; and
   communicating the information between the first and second interface devices.

4. The method according to claim 1 wherein the step of performing the hang-up and reconnection operation comprises:
   connecting the first interface device to the Internet network,
   obtaining, by the first interface device, a network address of the first interface device while remaining connected to the Internet network,
   communicating the network address to the second device via the switched telephone network
   disconnecting the first and second interface devices from the switched telephone network,
   connecting the second interface device connects to a corresponding Internet network access provider; and
   setting up the communication with the first interface device by virtue of the network address obtained previously via the switched telephone network.

5. The method according to claim 1 wherein the step of communicating between the first and second users comprises communicating by voice.

6. The method according to claim 1 wherein the step of communicating between the first and second users comprises communicating by video.

7. The method according to claim 1, further comprising:
   transmitting, when connecting the first interface device to the switched network, a clocked frequency of 1300 Hz; and
   triggering, by the second interface device, a carrier of lower frequency upon detection of the clocked frequency.

8. The method according to claim 1, further comprising storing a serial number in each interface device to identify it.

9. The method according to claim 8, wherein the step of performing the hang-up and reconnection operation comprises registering, via the Internet network, an IP address, serial number and session number of a corresponding interface device with a server connected to the Internet network.

10. The method according to claim 9, further comprising updating the session number of the first and second interface devices directly via the switched network.

* * * * *